United States Patent
Yun

(10) Patent No.: US 7,030,853 B2
(45) Date of Patent: Apr. 18, 2006

(54) RF SIGNAL DETECTING APPARATUS FOR LIQUID CRYSTAL DISPLAY AND DETECTING METHOD USING THE SAME

(75) Inventor: Sang Ho Yun, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 458 days.

(21) Appl. No.: 10/621,491

(22) Filed: Jul. 17, 2003

(65) Prior Publication Data

US 2004/0189619 A1 Sep. 30, 2004

(30) Foreign Application Priority Data

Mar. 31, 2003 (KR) ...................... 10-2003-0019946

(51) Int. Cl.
*G09G 3/36* (2006.01)
(52) U.S. Cl. ........................................ 345/104; 345/173
(58) Field of Classification Search ................ 345/104, 345/173, 177, 179; 178/18.03, 18.04, 19.02
See application file for complete search history.

(56) References Cited

U.S. PATENT DOCUMENTS

| | | | | |
|---|---|---|---|---|
| 5,283,556 A | * | 2/1994 | Ise | ............................... 345/174 |
| 5,581,274 A | * | 12/1996 | Tagawa | ....................... 345/104 |
| 5,854,881 A | * | 12/1998 | Yoshida et al. | ............. 345/104 |
| 6,246,393 B1 | * | 6/2001 | Watanabe et al. | ............ 345/173 |
| 2002/0135570 A1 | * | 9/2002 | Iisaka et al. | ................. 345/177 |

* cited by examiner

*Primary Examiner*—Sumati Lefkowitz
*Assistant Examiner*—Rodney Amadiz
(74) *Attorney, Agent, or Firm*—Ladas & Parry LLP

(57) ABSTRACT

Disclosed are a RF signal detecting apparatus of a liquid crystal display and a detecting method using the same. The RF signal detecting apparatus of liquid crystal display for receiving a RF signal emitted from a pen input device and thus detecting a horizontal position and a vertical position when inputting by pen comprises, a liquid crystal panel displaying images according to a liquid crystal driving signal, a plurality of gate lines driven by the liquid crystal driving signal and at the same time receiving RF signals emitted from the pen input device, a plurality of source lines driven by the liquid crystal driving signal and at the same time receiving RF signals emitted from the pen input device, a first signal detecting means for detecting a RF signal corresponding to a horizontal position from the RF signal received through the plurality of source lines, a second signal detecting means for detecting a RF signal corresponding to a vertical position from the RF signal received through the plurality of gate lines, and a location calculating means for calculating a horizontal position and a vertical position when inputting by pen from the RF signals detected by the first and second signal detecting means, wherein the first signal detecting means is located within a corresponding source driver IC, and the second signal detecting means is located within a corresponding gate driver IC.

9 Claims, 5 Drawing Sheets

RF SIGNAL DETECTING APPARATUS FOR LIQUID CRYSTAL DISPLAY AND DETECTING METHOD USING THE SAME

BACKGROUND OF THE INVENTION

1. Field of the Invention

The present invention relates to a RF signal detecting apparatus for liquid crystal display and a RF signal detecting method using the same, and more particularly to a RF signal detecting apparatus for liquid crystal display and a detecting method thereof, wherein a digitizer board for detecting a radio frequency signal (hereinafter referred to RF signal) emitted from a pen input device is integrated with a liquid crystal panel.

2. Description of the Related Art

Generally, a Tablet PC is a displaying and inputting device, comprises a liquid crystal panel module, a digitizer board, a digitizer control board and a pen tablet input device, and operates in such a manner that it emits a RF signal through a pen input device or a touch pad to a monitor and detects a location of the input device by detecting the emitted signal at the digitizer board.

FIG. 1A is a block diagram showing a RF signal detecting apparatus according to an embodiment of a prior art. As shown, the apparatus comprises a pen input device 10, a digitizer board 20 including a RF signal generator 20a, a RF signal transmitter 20b, a RF signal receiver 20c, and a RF signal detector 20d, a location calculator 30 and a system 40. Herein, the system 40 is a Tablet PC.

In the following, the operation of the RF signal detecting apparatus is briefly explained.

First, in the digitizer board 20, when the RF signal generator 20a emits a RF signal to the RF signal transmitter 20b, the RF signal transmitter 20b transmits the RF signal to the pen input device 10. The emitted RF signal is received into the pen input device 10, and then reflected and transmitted to the RF signal receiver 20c of the digitizer board 20.

Then, the RF signal detector 20d detects the RF signal received by the RF signal receiver 20c and transmits it to the location calculator 20c. Based on the RF signal detected by the RF signal detector 20d, the location calculator 30 calculates a horizontal (X) position and a vertical (Y) position when inputting by pen, transmits the resultant coordinate values to the system 40 via a serial interface.

FIG. 1B is a block diagram showing a RF signal detecting apparatus according to other embodiment of a prior art. In the figure, a pen input device is designated as a reference number 100, a RF signal generator is designated as a reference number 100a, a RF signal transmitter is designated as a reference number 100b, a digitizer board is designated as a reference number 120, a RF signal receiver is designated as a reference number 120a, a RF signal detector is designated as a reference number 120b, a location calculator is designated as a reference number 140, and a system is designated as a reference number 160.

Although the RF signal detecting apparatus of the FIG. 1B has a similar structure to that of the FIG. 1A, it has a difference in regard to generating a RF signal. Specifically, in the apparatus of FIG. 1A, the RF signal is generated by the RF signal generator 20a provided in the digitizer board 20 and emitted to the pen input device 10. However, in the apparatus of FIG. 1B, the RF signal is directly generated by the RF signal generator 100a provided in the pen input device 100 and emitted to the digitizer board 120. Except the structure difference, the operation of the apparatus of the FIG. 1B can be easily understood from the description of the FIG. 1A. Therefore, detailed explanations of it are omitted.

FIG. 2 illustrates a liquid crystal display equipped with a digitizer board according to a prior art.

As shown in FIG. 2, the prior liquid crystal display comprises a liquid crystal panel 200, a Source Printed Circuit Board 220 connected to a side of the liquid crystal panel 200 via a TCP (Tape Carrier Package) 210, a digitizer board 230 located to a back side of the liquid crystal panel 200 and detecting a RF signal, a digitizer control board 240 comprising a location calculator for calculating a horizontal (X) position and a vertical (Y) position when inputting by pen, and a system 250 receiving the calculated horizontal and vertical positions through the digitizer control board 240. A source driver IC 210a is mounted on the TCP 210 and a gate driver IC (not shown) is mounted on a TCP (not shown) connected to the other side of the liquid crystal panel 200.

As explained above, in the prior RF signal detecting apparatus, the digitizer board for detecting the RF signal is located to the back side of the liquid crystal panel. As a result, the position detection in pen inputting becomes inaccurate. The reason for this is that the RF receiver of the digitizer board cannot function properly due to the limitation of the frequency used in the liquid crystal panel.

Further, the prior RF signal detecting apparatus has many disadvantages such that the number of the parts and the manufacturing costs are increased when assembling.

SUMMARY OF THE INVENTION

Accordingly, the present invention has been made to solve the above-mentioned problems occurring in the prior art. The object of the present invention is to provide a RF signal detecting apparatus and a RF signal detecting method using the same being capable of ensuring an accuracy of transmitting and receiving a signal and a structure simplicity by having separate components for receiving, detecting and calculating a RF signal within a liquid crystal panel, a timing controller or a driver IC.

In order to accomplish this object, there is provided a RF signal detecting apparatus for liquid crystal display, for receiving a RF signal emitted from a pen input device and thus detecting a horizontal position and a vertical position when inputting by pen, the apparatus comprising: a liquid crystal panel displaying images according to a liquid crystal driving signal; a plurality of gate lines driven by the liquid crystal driving signal and at the same time receiving RF signals emitted from the pen input device; a plurality of source lines driven by the liquid crystal driving signal and at the same time receiving RF signals emitted from the pen input device; a first signal detecting means for detecting a RF signal corresponding to a horizontal position from the RF signals received through the plurality of source lines; a second signal detecting means for detecting a RF signal corresponding to a vertical position from the RF signals received through the plurality of gate lines; and a location calculating means for calculating a horizontal position and a vertical position when inputting by pen from the RF signals detected by the first and second signal detecting means, wherein the first signal detecting means is located within a corresponding source driver IC, and the second signal detecting means is located within a corresponding gate driver IC.

In order to accomplish the above object, there is provided a method for detecting a RF signal of a liquid crystal display, by receiving a RF signal emitted from a pen input device and thus detecting a horizontal position and a vertical position when inputting by pen, the method comprising the steps of: receiving RF signals emitted from the pen input device through a plurality of gate lines and a plurality of source lines; detecting RF signals corresponding to a horizontal position and a vertical position from the RF signals respectively received through the plurality of source lines and the plurality of gate lines; and calculating the horizontal position and the vertical position from the detected RF signals.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1A:
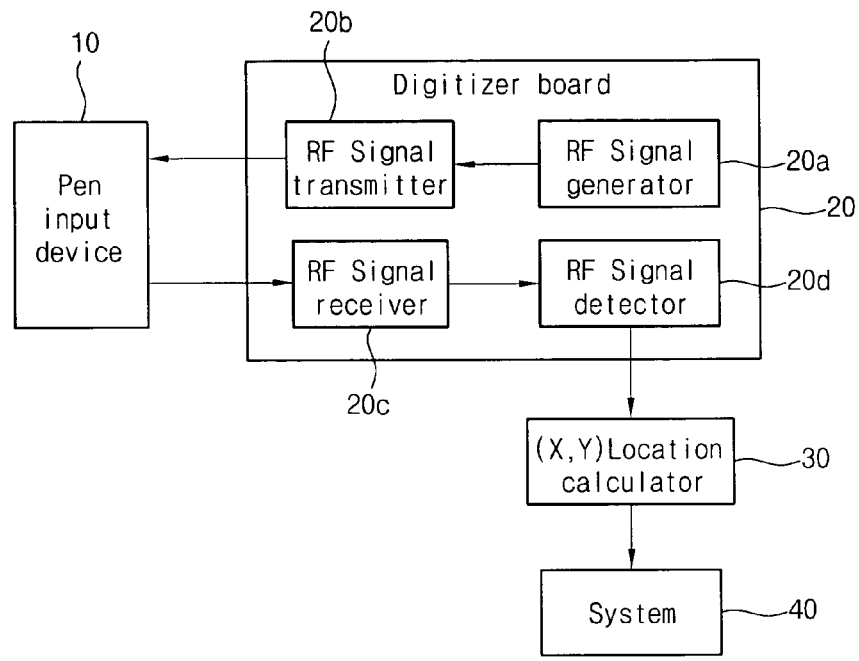
FIGS. 1A and 1B are block diagrams showing a RF signal detecting apparatus in accordance with a prior art.
Figure 1B:
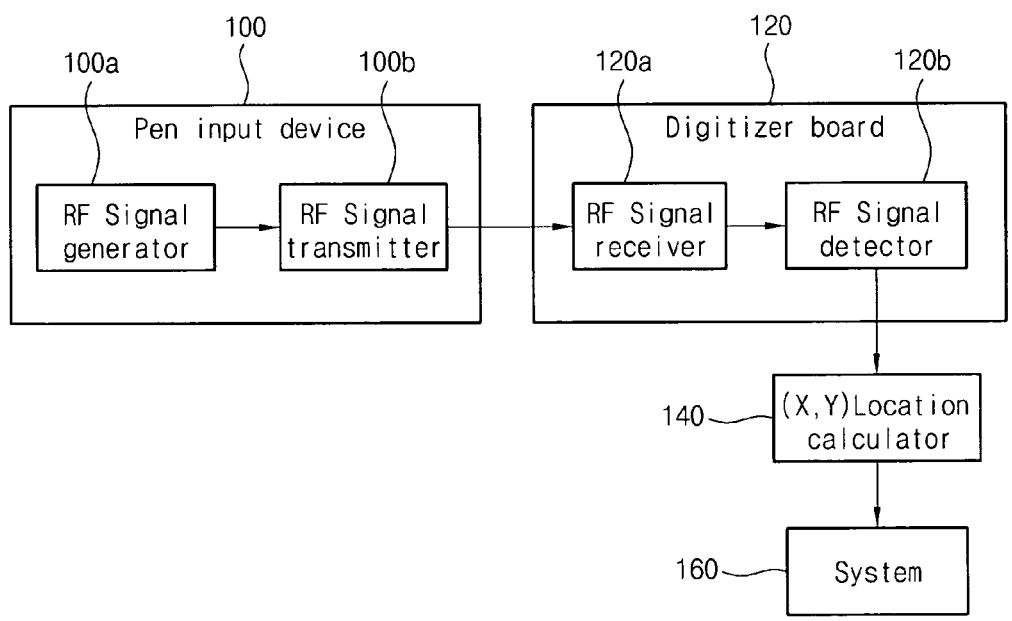
Figure 2:
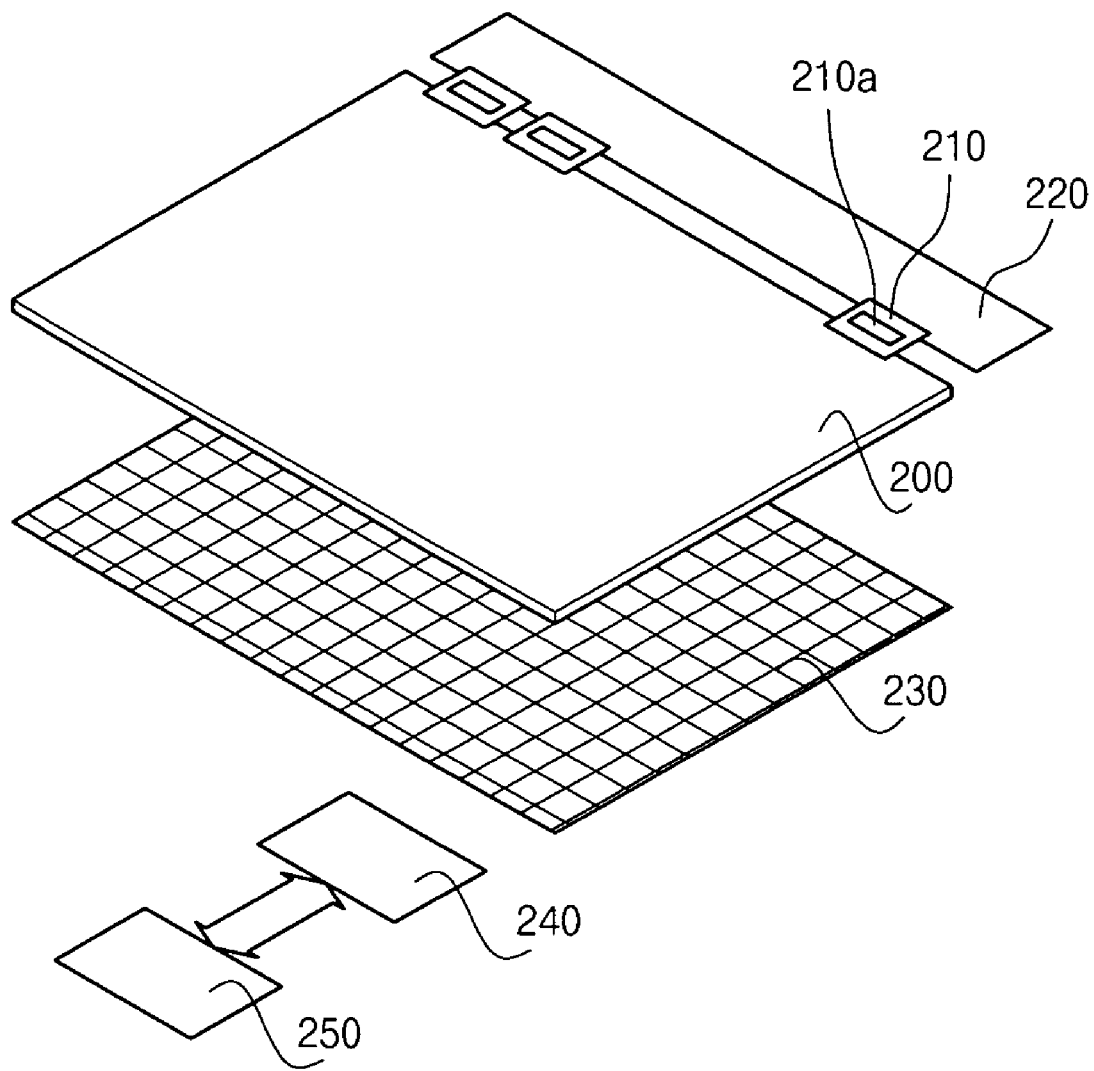
FIG. 2 illustrates a liquid crystal display equipped with a digitizer board according to a prior art.
Figure 3:
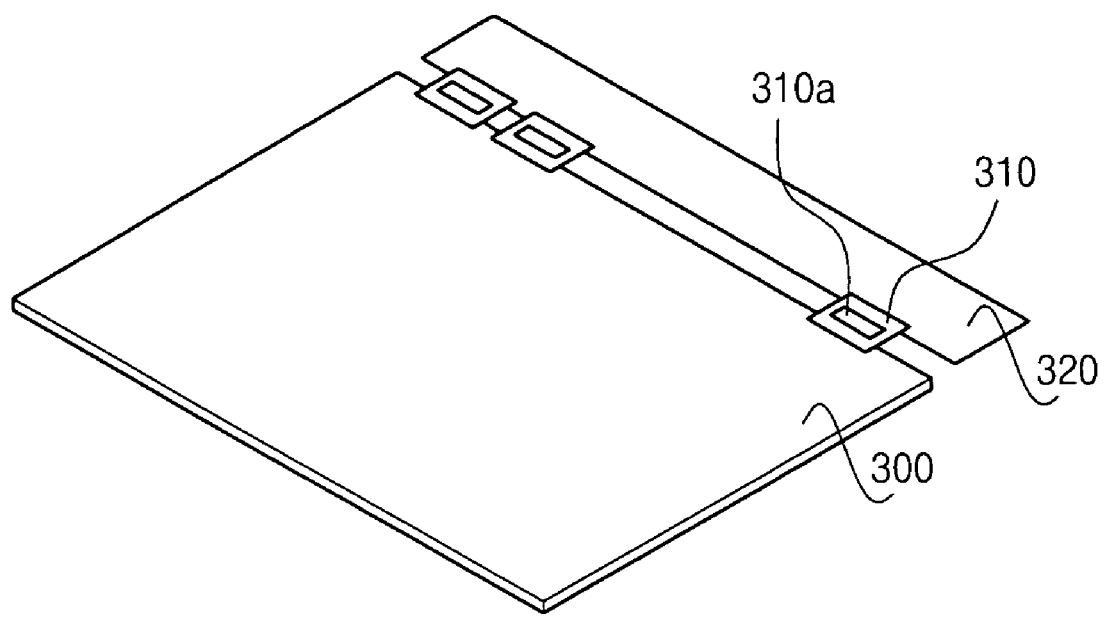
FIG. 3 illustrates a liquid crystal display in accordance with a preferred embodiment of the invention.

FIG. 3 illustrates a liquid crystal display according to a preferred embodiment of the invention with a digitizer board omitted. As shown, the liquid crystal display comprises a liquid crystal panel 300, and a source PCB 310 connected to a side of the liquid crystal panel 300 via a TCP 310 and providing a liquid crystal driving signal and a variety of control signals for the liquid crystal panel 300. A source driver IC 310a is mounted on the TCP 310, and a gate driver IC (not shown) is mounted on a TCP (not shown) connected to the other side of the liquid crystal panel 300.

According to other embodiment of the invention, the source driver IC and the gate driver IC may be mounted on the liquid crystal panel in a type of COG (Chip on Glass).

Figure 4:
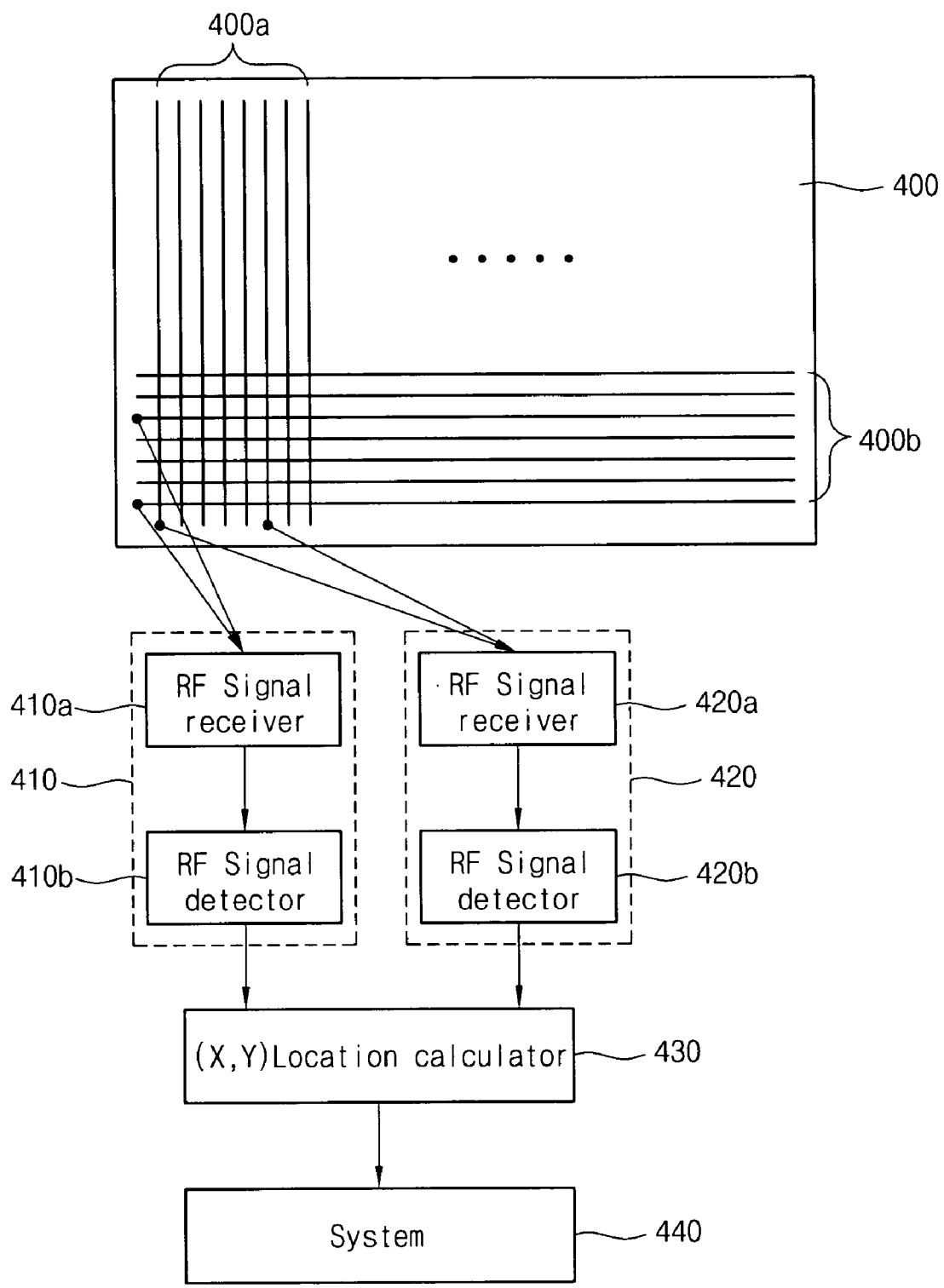
FIG. 4 is a block diagram showing a RF signal detecting apparatus according to the invention.

FIG. 4 is a block diagram showing a RF signal detecting apparatus according to the invention. As shown, the apparatus comprises a liquid crystal panel 400 including a plurality of gate lines 400a and a plurality of source lines 400b intercrossing each other in the form of a matrix, a first signal detecting part 410 for detecting a RF signal received through the plurality of source lines 400b, a second signal detecting part 420 for detecting a RF signal received through the plurality of gate lines 400a, a location calculating part 430 for calculating a horizontal (X) position and a vertical (Y) position when inputting by pen, based on the RF signals detected by the first and second signal detecting parts 410, 420.

According to the invention, some lines of the plurality of gate lines and source lines are selected and used as a antenna for receiving RF signals emitted from a pen input device, and preferably the RF signals received from the antenna have a frequency band of 30~40 MHz in order not to be affected by a LCD driving module frequency.

The first signal detecting part 410 comprises a RF receiver 410a for receiving the RF signal inputted through the plurality of source lines 400b, extracting and outputting a RF signal corresponding to a horizontal (X) position, and a RF signal detector 410b for detecting and outputting the extracted RF signal.

The second signal detecting part 420 comprises a RF receiver 420a for receiving the RF signal inputted through the plurality of gate lines 400a, extracting and outputting a RF signal corresponding to a vertical (Y) position, and a RF signal detector 420b for detecting and outputting the extracted RF signal.

The detected signals by the first and second signal detection part 410, 420 are transmitted to the location calculating part 430 in which the corresponding position values when inputting by pen are calculated.

Referring to FIG. 4, a RF signal detecting method by the apparatus of the invention constructed as the above is explained as follows.

First, it is performed to receive RF signals emitted from the pen input device through the plurality of gate lines 400a and source lines 400b. In doing so, the signals received through the plurality of source lines 400b are transmitted to the RF signal receiver 410a of the first signal detecting part 410, and the signals received through the plurality of gate lines 400a are transmitted to the RF signal receiver 420a of the first signal detecting part 420.

Then, it is performed to detect RF signals corresponding to a horizontal position and a vertical position from the RF signals received through the plurality of source lines 400b and gate lines 400a, respectively.

The above detecting step will be specifically described. The RF receiver 410a of the first signal detecting part 410 receives the RF signals inputted from the plurality of source lines 400b and extracts the RF signal corresponding to the horizontal position from the received signals. Then, the RF signal detector 410b of the first signal detecting part 410 detects and outputs the extracted RF signal. Meanwhile, the RF receiver 420a of the second signal detecting part 420 receives the RF signals inputted from the plurality of gate lines 400a and extracts the RF signal corresponding to the vertical position from the received signals. Then, the RF signal detector 420b of the second signal detecting part 420 detects and outputs the extracted RF signal.

Then, the detected RF signals by the RF signal detectors 410b, 420b, respectively are inputted to the location calculating part 430 in which the horizontal (X) position and the vertical (Y) position when inputting by pen are calculated from the detected RF signals.

Figure 5:
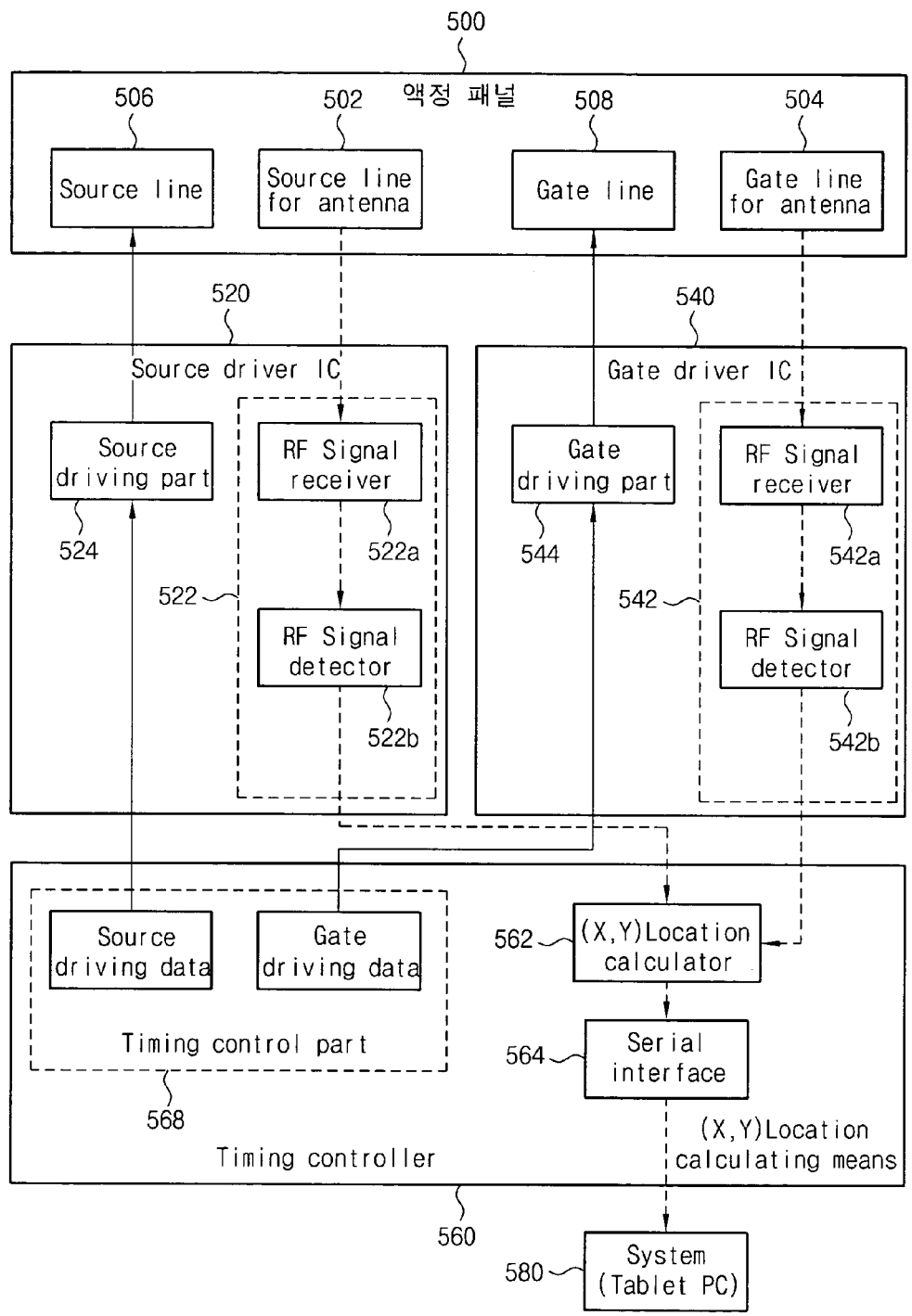
FIG. 5 is a detailed block diagram showing the RF signal detecting apparatus in FIG. 4.

FIG. 5 is a detailed block diagram showing the RF signal detecting apparatus in FIG. 4. In the figure, a liquid crystal panel is designated as a reference number 500, a source line for the antenna is designated as a reference number 502, a gate line for the antenna is designated as a reference number 504, a source line is designated as a reference number 506, a gate line is designated as a reference number 508, a source driver IC is designated as a reference number 520, a first signal detecting part is designated as a reference number 522, a RF signal receiver is designated as a reference number 522a, a RF signal detector is designated as a reference number 522b, a source driving part is designated as a reference number 524, a gate driver is designated as a reference number 540, a second signal detecting part is designated as a reference number 542, a RF signal receiver is designated as a reference number 542a, a RF signal detector is designated as a reference number 542b, a gate driving part is designated as a reference number 544, a timing controller is designated as a reference number 560, a location calculating part is designated as a reference number 562, a serial interface is designated as a reference number 564, a timing control part is designated as a reference number 568, and a system is designated as a reference number 580.

Referring to FIG. 5, the RF signal detecting apparatus according to the invention substitutes for the prior digitizer board 200, and for the purpose of receiving the RF signals emitted from the pen input device, uses some lines 502, 504 of the plurality of source lines and gate lines arranged in the form of a matrix in the liquid crystal panel 500. The lines 502, 504 function as an antenna.

According to the invention, the source driver IC 520 comprises the first signal detecting part 522 and the source driving part 524. The source driving part 524 provides a liquid crystal driving signal for the source line 506, based on a source driving data occurring in the timing controller 560.

According to the invention, the gate driver IC 540 comprises the second signal detecting part 542 and the gate driving part 544. The gate driving part 544 provides a liquid crystal driving signal for the gate line 508, based on a gate driving data occurring in the timing controller 560.

According to the invention, the timing controller 560 comprises the location calculating part 562 for calculating a horizontal position and a vertical position from the RF signals detected by the first and second signal detecting part, the serial interface 564 for serial transmission the resultant values calculated by the location calculating part 562 to the system 580, and the timing control part 568 generating the source driving data and the gate driving data.

As described above, the RF signal detecting apparatus for the liquid crystal display according to the invention dispersedly has components for receiving, detecting and calculating a RF signal within a liquid crystal panel, a timing controller or a driver IC and omits the existing digitizer board, thus making its structure simple. Also, since the apparatus has the control board etc. within the liquid crystal module, it is not necessary to manufacture a separate additional equipment. Therefore, it is possible to increase a manufacture yield and reduce the manufacturing costs.

Additionally, since the apparatus can use more gate lines and source lines as an antenna than when the digitizer board is separately made and used, it is possible to detect the RF signal more accurately.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for detecting a RF signal of a liquid crystal display, by receiving a RF signal emitted from a pen input device and thus detecting a horizontal position and a vertical position when inputting by pen, the method comprising the steps of: receiving RF signals emitted from the pen input device through a plurality of gate lines and a plurality of source lines; a plurality of gate lines driven by the liquid crystal driving signal and at the same time receiving RF signals emitted from the pen input device; a plurality of source lines driven by the liquid crystal driving signal and at the same time receiving RF signals emitted from the pen input device; detecting RF signals corresponding to a horizontal position and a vertical position from the RF signals received through the plurality of source lines and the plurality of gate lines, respectively; and calculating the horizontal position and the vertical position from the detected RF signals.

2. The RF signal detecting apparatus according to claim 1, wherein the RF signals have a frequency band of 30~40 MHz.

3. The RF signal detecting apparatus according to claim 1, wherein the location calculating means is located within a timing controller to calculate the horizontal position and the vertical position from the RF signals received by the plurality of source lines and the plurality of gate lines, respectively.

4. The RF signal detecting apparatus according to claim 1, wherein the vertical position is calculated based on the RF signal received through the plurality of gate lines.

5. The RF signal detecting apparatus according to claim 1, wherein the horizontal position is calculated based on the RF signal received through the plurality of source lines.

6. The RF signal detecting apparatus according to claim 1, wherein the location calculating means is serially communicated with a system interface board via a serial interface.

7. A method for detecting a RF signal of a liquid crystal display, by receiving a RF signal emitted from a pen input device and thus detecting a horizontal position and a vertical position when inputting by pen, the method comprising the steps of:
    receiving RF signals emitted from the pen input device through a plurality of gate lines and a plurality of source lines;
    detecting RF signals corresponding to a horizontal position and a vertical position from the RF signals received through the plurality of source lines and the plurality of gate lines, respectively; and
    calculating the horizontal position and the vertical position from the detected RF signals.

8. The method according to claim 7, wherein the vertical position is calculated based on the RF signal received through the plurality of gate lines.

9. The method according to claim 7, wherein the horizontal position is calculated based on the RF signal received through the plurality of source lines.

* * * * *